United States Patent
Tabellini

[19]

[11] Patent Number: 6,082,716

[45] Date of Patent: Jul. 4, 2000

[54] SHOCK ABSORBER DEVICE FOR TELESCOPIC PROTECTION DEVICES

[75] Inventor: Giorgio Tabellini, Sasso Marconi, Italy

[73] Assignee: P.E.I. Protezioni Elaborazioni Industriali, S.r.l., Bologna, Italy

[21] Appl. No.: 08/931,469

[22] Filed: Sep. 16, 1997

[30] Foreign Application Priority Data

Sep. 30, 1996 [IT] Italy ................................. B096A0491
Jun. 12, 1997 [EP] European Pat. Off. ............. 97830285

[51] Int. Cl.[7] .............................. F16M 1/00; F16M 3/00; F16M 5/00; F16M 7/00
[52] U.S. Cl. ............................. 267/139; 267/85; 267/109
[58] Field of Search ..................... 267/163, 164, 267/42, 44, 135, 136, 85, 109, 139; 49/9

[56] References Cited

FOREIGN PATENT DOCUMENTS

| 290822 | 11/1988 | European Pat. Off. . |
| 502328 | 9/1992 | European Pat. Off. . |
| 71 37 781 | 11/1972 | Germany . |
| 7137781 | 11/1972 | Germany . |
| 89 01 686 | 3/1989 | Germany . |
| 38 29 984 | 10/1989 | Germany . |
| 61-65623 | 5/1996 | Japan . |

*Primary Examiner*—Robert J. Oberleitner
*Assistant Examiner*—Robert A. Siconolfi
*Attorney, Agent, or Firm*—Fay, Sharpe, Fagan, Minnich & McKee

[57] ABSTRACT

The shock absorber device for telescopic protection devices is formed of a plurality of tubular covering elements which slide inside one another in a defined direction, each tubular element having a scraper and a stop on the scraper, the shock absorber device including at least one shock absorber part, positioned and operating between the scraper and the stop of two adjacent tubular elements, and a second shock absorber part, positioned and operating between the stops of two adjacent tubular elements, each shock absorber part consisting of a portion which connects it to a slotted zone or seat on the bar or stop and at least one flexible arm which extends from the connecting portion in a plane parallel with the direction of extension, the flexible arm being separated from the bar or stop by a given distance and including a first section substantially parallel with the bar or stop and a second section connected to the first and extending away from the said first section at an oblique angle to the bar or stop.

18 Claims, 4 Drawing Sheets

SHOCK ABSORBER DEVICE FOR TELESCOPIC PROTECTION DEVICES

BACKGROUND OF THE INVENTION

The present invention relates to a shock absorber device for telescopic protection devices of the type consisting of a plurality of box-shaped elements. Protection devices of this type are mainly used for the guides of automatic machines, machine tools and robots, to prevent foreign matter, such as dirt, chippings and emulsions used to cool the area machined, from entering the guide contact zone.

Scrapers, normally made of elastomer or plastics, are fitted amongst the box-shaped elements. The scrapers not only prevent foreign matter from entering the gap between two contiguous box-shaped elements, but also allow the formation of a satisfactory hermetic seal. Since the protection device is connected to the mobile part of the machine, extension of the box-shaped elements follows the speed of these mobile parts. This speed may be high and, considering the mass of the box-shaped elements, when the protection device is fully extended, a significant impact force between the box-shaped elements may be reached. Obviously, such impact must be avoided, to prevent wear on the protection device, to avoid the effects on the mobile parts of the machine and to limit the noise level.

It is, therefore, essential to fit shock absorber devices between the box-shaped elements. An example of these shock absorber devices is described in the patent for utility model DE-U-7137781. In the said document, the shock absorber device is simply obtained by applying a strip of synthetic cellular material to the rear of the scraper and the zone which makes contact with the smallest adjacent box-shaped element.

Another type of shock absorber device for the box-shaped elements of a telescopic protection device, made with a strip of synthetic material different to the scraper material is described in patent EP-B-290-822. To increase the shock absorbing effect of the shock absorber devices made of strips of synthetic material, patent EP-B-502-328 describes a shock absorber device made using a strip of elastic material with holes which increase the deformability of the strip.

However, due to the high speed of the mobile machine parts, the mass of the box-shaped elements and the limited deformability of the shock absorber devices, impact is still possible with these types of shock absorber devices.

Moreover, when such protection devices arrive at the maximum extension, the elements which form the protection devices stop, passing from a high speed to zero velocity in a very short time, and so are subject to high deceleration, which may have a damaging effect on the mobile parts of the machines.

Since these shock absorber devices are continuous along the entire perimeter of the box-shaped element, they are also relatively expensive.

The aim of the present invention is to improve the capacity for absorption of impact between the elements which form the protection device.

SUMMARY OF THE INVENTION

The present invention provides a shock absorber device which allows impact absorption on a section of the protection element extension stroke longer than that of known devices, and a shape which allows more effective dispersal of the impact energy between the protection elements.

BRIEF DESCRIPTION OF THE DRAWINGS

Other advantages of the invention are clearly described in the claims herein and the advantages of the invention are more clearly apparent from the detailed description below, with reference to the accompanying drawings which illustrate a preferred embodiment, and in which:

DESCRIPTION OF THE PREFERRED EMBODIMENTS

Figure 1:
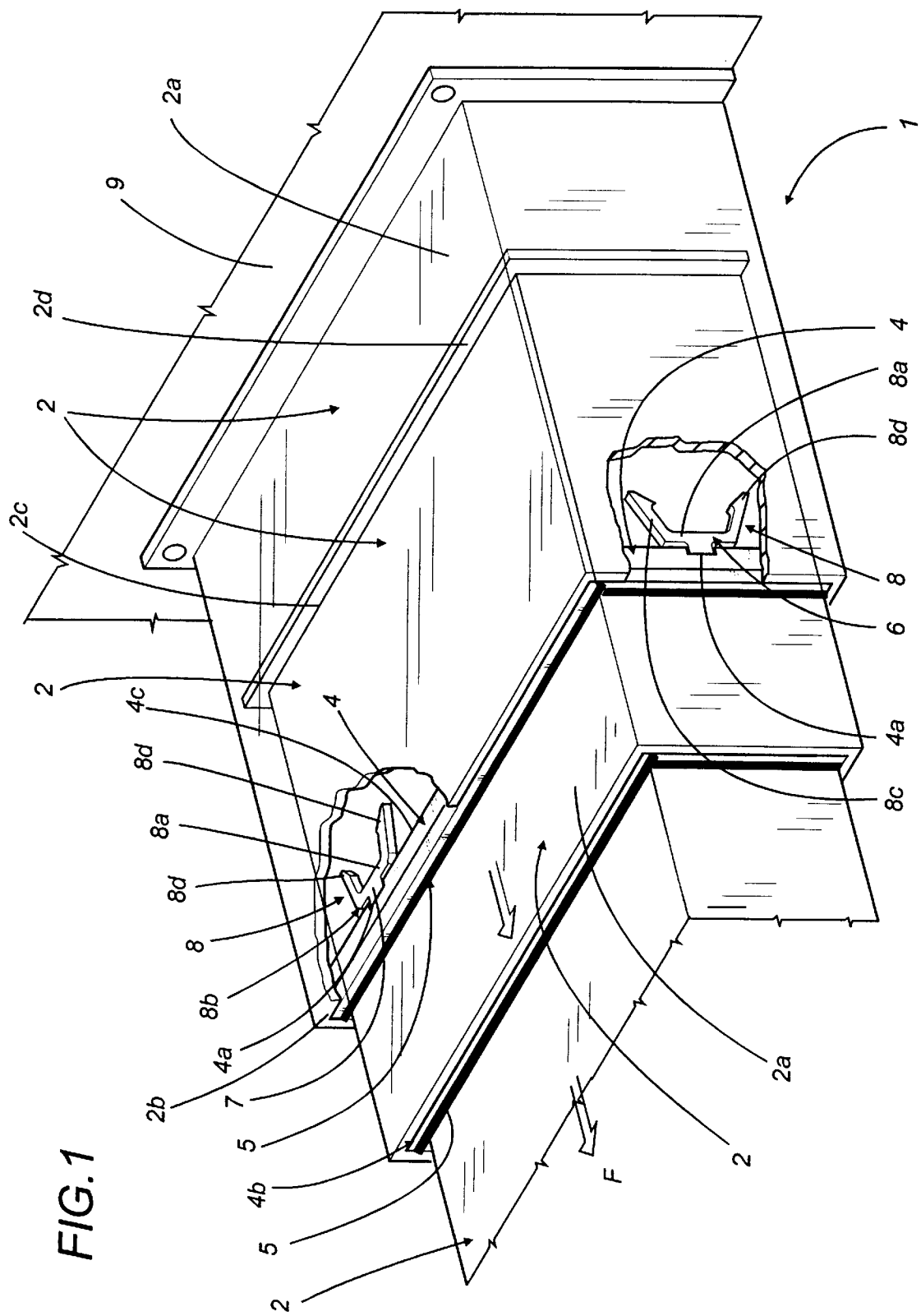
FIG. 1 is a perspective view of the telescopic protection device to which the shock absorber device disclosed is connected.

The accompanying drawings show a telescopic protection device, labeled 1 as a whole, for automatic machines, machine tools and robots which are not illustrated. One end of the telescopic protection device 1 is secured to a fixed part 9 of the machine, the other end being fixed to a mobile part 10 of the machine, there being the possibility of extending the latter end in the direction of the arrow F.

The tubular elements 2 have at least one wall 2a, one front edge 2b and one rear edge 2c, and are made, for example, of steel, being of the known type.

The scraper device and shock absorber device assembly is labeled 3. As indicated in FIGS. 1 through 5, the shock absorber device includes at least one shock absorber part 6, which is fixed at the rear margin 4c of a bar 4, which in turn has a scraper 5 fitted at its front margin 4b. The bar 4 is fixed to the front edge 2b of the tubular element 2.

The shock absorber part 6 includes a portion 7 which connect it to the rear margin 4c of the bar 4, inserted in a slotted zone 4a by means of two tabs 12.

The shock absorber device 6 also includes two flexible arms 8 which extend in a plane parallel with the direction of extension of the arrow F, said arms being divergent. Each arm 8 consists of a first section 8a, substantially parallel with the rear margin 4c and at a given distance d from the said margin, and a second section 8c, connected to the first section 8a.

The second section 8c extends away from the first section 8a at an oblique angle to the rear margin 4c. Section 8a and the two sections 8c substantially form a U-shape with diverging ends.

The angle of the second section 8c to the first section 8a is between 95 and 175 degrees and is preferably 105 degrees.

There is a chamfer or pivot point 8b on the surface facing the rear margin 4c at the connection between the first section 8a and the second section 8c. The end of the second section 8c has a chamfered point 8d or is shaped so that the end is pointed 8d.

The function of these parts 8b and 8d and of the connecting portion 7 will be made clear in the explanation of device operation.

The material used to make the shock absorber device may be metal, for example harmonic steel, covered with a layer of plastic to prevent wear on the contact surface, or the shock absorber device may be made completely of plastic with suitable elastic characteristics.

Figure 2:
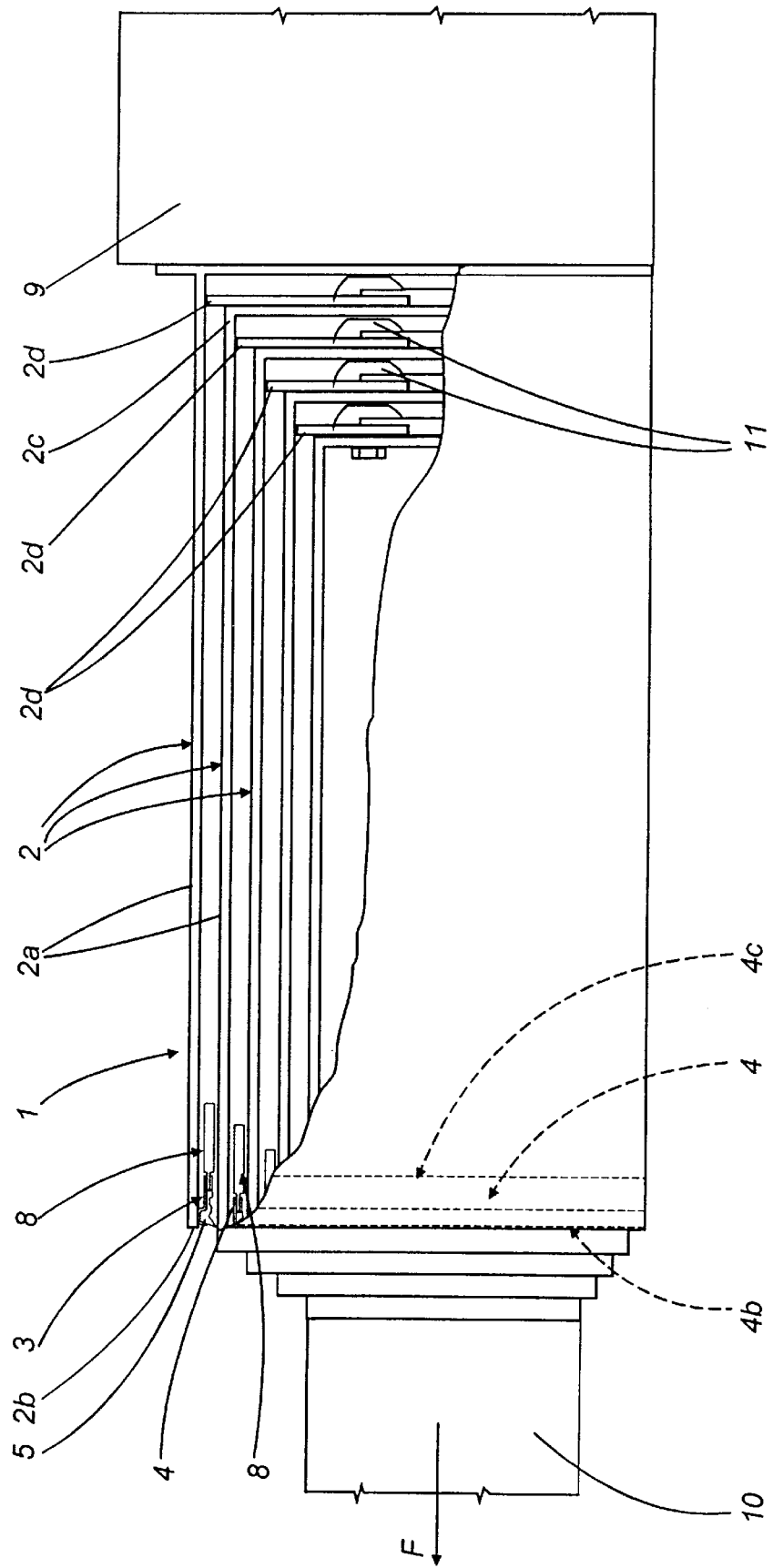
FIG. 2 is a cross-section of the telescopic protection device shown in FIG. 1.

The telescopic protection device 1 starts in the condition illustrated in FIG. 2. In the said figure the tubular elements 2 are completely retracted and are almost completely inside one another. The tubular elements 2 slide relative to one another on special shoes, not illustrated, and have an end stop 11 to dampen the retraction stroke when the said elements are closing.

When the mobile part 10 of the automatic machine, machine tool or robot moves, the telescopic protection device 1 starts to extend in the direction of the arrow F.

Figure 3:
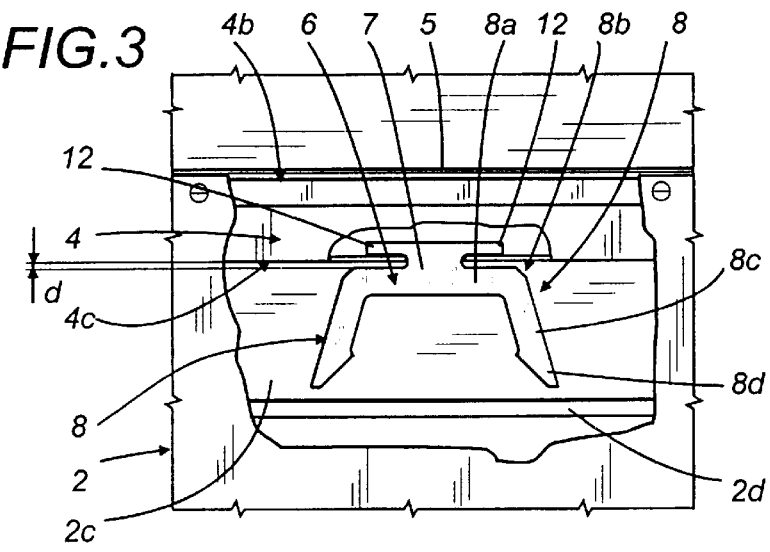
FIGS. 3, 4 and 5 show a sequence of the shock absorbing stages of the device disclosed.
Figure 3:
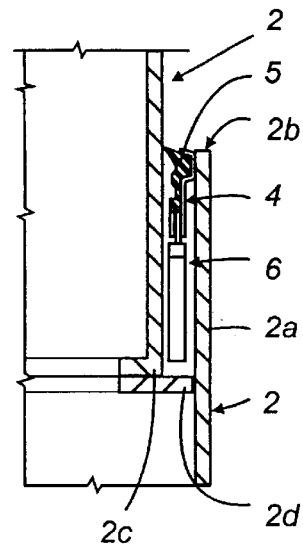

FIG. 3 illustrates the condition of two tubular elements 2 which are almost completely extended, but with the shock absorber part 6 still not operating. Subsequently, continuing extension, the shock absorber part 6 makes contact with the stop 2d of next smaller adjacent tubular element 2. The special chamfered or pointed shape of the end 8d of the arm 8 of the shock absorber part 6 rests against and slides on the stop 2d, facilitating the divergence of the arms 8.

At the same time, the section 8a of the arm 8, initially straight, tends to curve following divergence of the section 8c and because it is at a distance d from the rear margin 4c of the bar 4. Therefore, even the chamfer 8b makes contact with the rear margin 4c of the bar 4.

Figure 4:
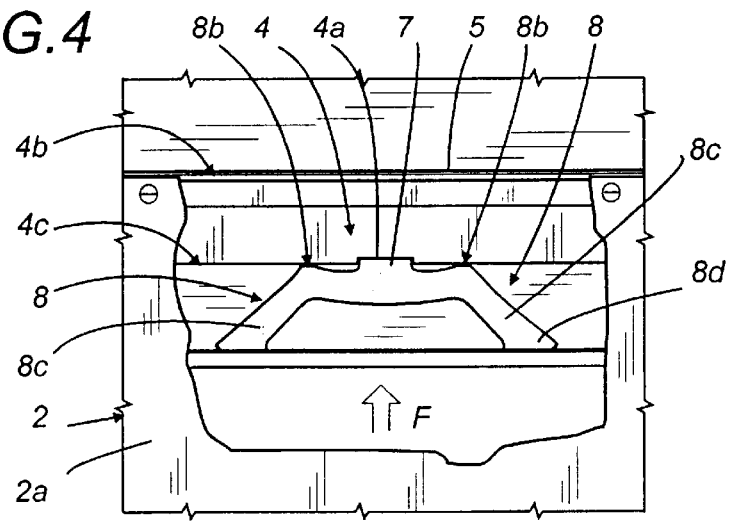
Figure 4:
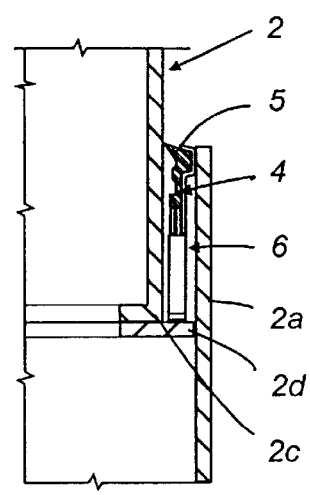

This condition, with divergent sections 8c and chamfers 8b in contact with the bar 4 is illustrated in FIG. 4.

Then, continuing the extension of the tubular elements 2, the sections 8c, pivoting on the chamfer 8b, continue their divergence, increasing the angle made to section 8a, whilst section 8a continues to curve, its middle part moving away from the rear margin 4c and so increasing its distance relative to the initial distance d, and tensioning the connecting portion 7.

Figure 5:
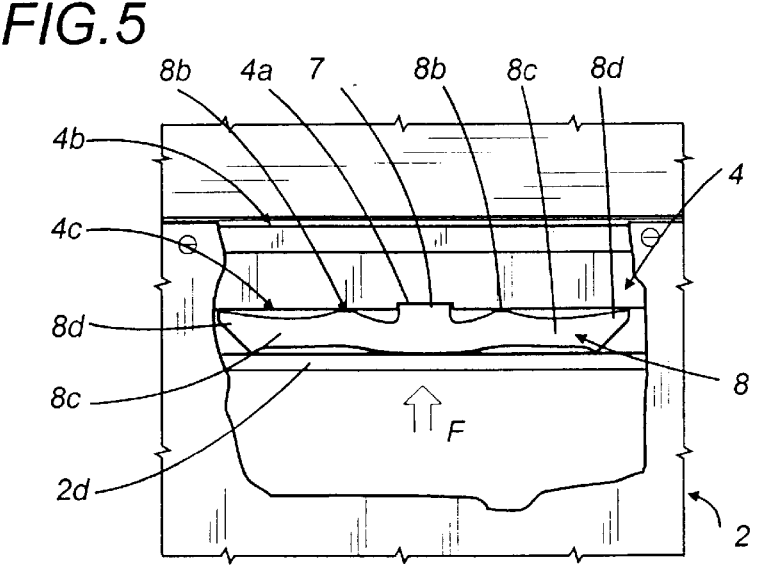
Figure 5:
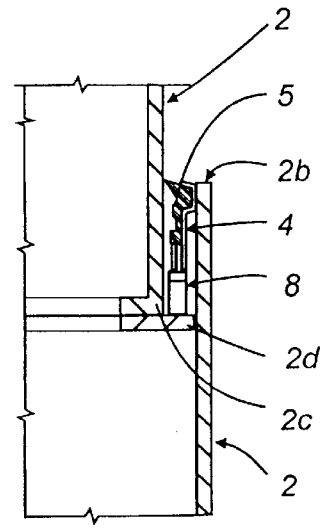

The final condition, consisting in complete extension of the protection device, and so complete shock absorption, is illustrated in FIG. 5.

Alternatively, the shock absorber part may be fitted to the stop 2d of the tubular elements independent of the scrapers. In this case, as shown in the embodiment illustrated in FIG. 6, the shock absorber device 6 may be attached to another shock absorber device 13 of almost the same shape.

This second shock absorber device 13 absorbs the impact between the tubular elements 2 when the protection device is on its retraction stroke, thus substituting the end stops 11.

Figure 6:
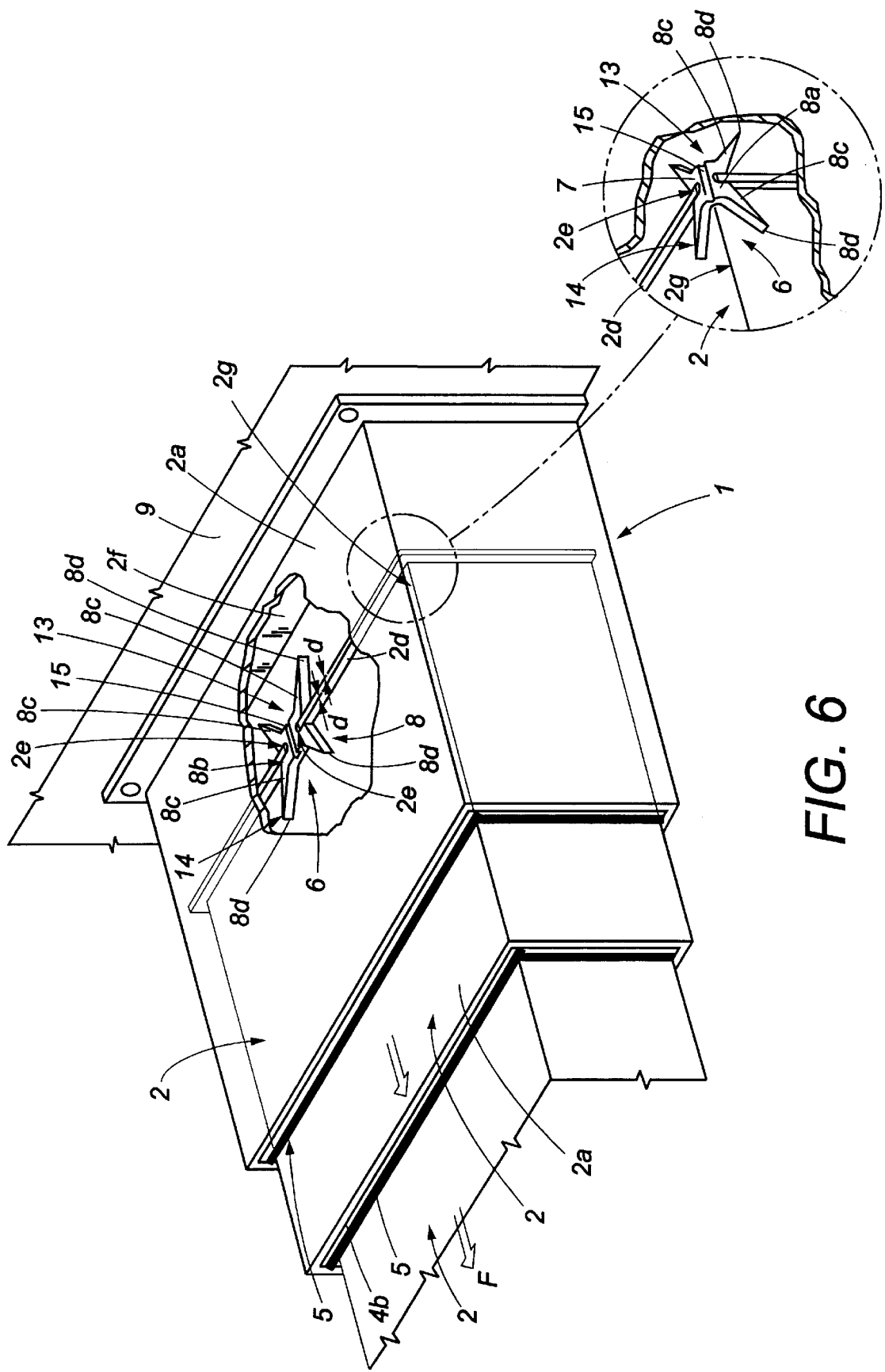
FIG. 6 is a perspective view of the telescopic protection device to which the shock absorber device is fitted, this being an alternative embodiment of the invention illustrated in FIG. 1.

As shown in FIG. 6, the shock absorber device 13 is positioned and operates between two stops, one external 2d and the other internal 2f, of two adjacent tubular elements 2.

In the embodiment shown in FIG. 6, the two shock absorber devices 6 and 13 can be joined to form a single shock absorber device 14 with the twin function of absorbing the impact between the tubular elements both during extension and during retraction. The shock absorber device 14 is inserted in a special seat 2e made in the stop 2d and may also be positioned at the edge 2g of the horizontal and vertical walls of the tubular element 2.

This edge position helps to straighten the protection device at the end of the extension or retraction stroke, and allows the number of shock absorber elements to be reduced to two for each tubular element 2, thus being very economical.

To promote the bending of the shock absorber device 14 on the horizontal and vertical walls of the tubular element 2, the shock absorber device 14 has a crosswise groove 15 parallel with the edge 2g of the tubular element 2.

During operation, it should be noticed that shock absorption is due to different factors.

Initially, there is the sliding of the point 8d on the stop 2d, divergence of the sections 8c and consequent curving of section 8a. Then, increasing the divergence of the sections 8c, there is a relative rotation between sections 8a and 8c, the chamfer 8b forming the pivot. At the same time, section 8a tensions the connecting portion 7. This shock absorption method also applies in the case of shock absorber device 13 during the retraction stroke of the protection device, where it rests on the stop 2f.

The shock absorption capacities of this device are clearly significantly greater than those of known devices. The shock absorbing action develops gradually over a relatively long stroke.

Thanks to its significant shock absorption capacities, only a few shock absorber parts need be fitted on the tubular elements, and it may even be possible to fit only one shock absorber part for each tubular element. The present invention, thus designed for the said objects, may be subject to numerous modifications and variations, all encompassed by the original design concept. Moreover, all components may be replaced with technically equivalent parts.

What is claimed:

1. A shock absorber device for telescopic protection devices, said protection devices including a plurality of tubular covering elements which slide inside one another in a defined direction, each tubular element having a front edge and a rear edge, said front edge being fitted with a scraper connected to the front margin of a supporting bar, said bar being fixed along the front edge and said rear edge being fitted with a stop for a rear margin of the bar during the extension of the tubular elements, the device including at least a first shock absorber part, being positioned and operating between the rear margin and the stop of two adjacent tubular elements, said first shock absorber part alternatively being fitted to the rear margin or the stop, said first shock absorber part comprising:

at least a portion for connection to a slotted zone or seat on the rear margin or the stop by connecting means; and at least one flexible arm in a plane substantially parallel with the direction of sliding, said flexible arm extending from the connecting portion and protruding from the bar or stop towards the stop or the rear margin, so as to absorb the impact between the two adjacent tubular elements when the telescopic protection device is in the extension stage, wherein the flexible arm of the shock absorber part includes a first section, this being substantially perpendicular to the direction of extension of the tubular elements and being spaced apart all along its length from the element to which the connecting portion is connected.

2. The shock absorber device for telescopic protection devices as described in claim 1 wherein there is at least one second shock absorber device, positioned and operating between two stops, one external and one internal, of two adjacent tubular elements, so as to absorb the impact between the two adjacent tubular elements, during the telescopic protection device retraction stroke.

3. The shock absorber device for telescopic protection devices as described in claim 2 wherein the second shock absorber device consists of at least a portion for the connection to a slotted zone or seat of the stop by connecting means and at least one flexible arm, said arm being positioned in a plane substantially parallel with the direction of sliding, said flexible arm extending from the connecting portion and protruding from the stop of a tubular element towards the stop of another, adjacent, tubular element.

4. The shock absorber device for telescopic protection devices as described in claim 2 wherein the first shock absorber part and the second shock absorber part are joined together by the connecting portion, forming a single shock absorber element with a twin shock absorption function when the telescopic protection device is extending and retracting.

5. The shock absorber device for telescopic protection devices as described in claim 1, wherein the flexible arm includes a second section connected to the first section and extending away from the first section at an oblique angle to the direction of extension of the tubular elements.

6. The shock absorber device for telescopic protection devices as described in claim 1 wherein the first and second shock absorber parts each include two divergent flexible arms.

7. The shock absorber device for telescopic protection devices as described in claim 5 wherein the second section of the flexible arm of the shock absorber parts can tilt at an angle of between 95 and 175 degrees relative to the first section.

8. The shock absorber device for telescopic protection devices as described in claim 5 wherein the second section of the flexible arm of the shock absorber parts can tilt at an angle of 105 degrees relative to the first section.

9. The shock absorber device for telescopic protection devices as described in claim 1 wherein the shock absorber parts are made of flexible sheet metal covered with a layer of strong plastic.

10. The shock absorber device for telescopic protection devices as described in claim 1 wherein the shock absorber parts are completely made of an elastic plastic.

11. A scraper device, include a shock absorber device as described in claim 1, at the connection of the first section and second section of the flexible arm, the surface facing a fixing element of the shock absorber part has a chamfer or pivot point, so that when the arm is pressed towards the fixing element, the second section, resting on the chamfer or pivot point, rotates relative to the first section.

12. The shock absorber device for telescopic protection devices as described in claim 1 wherein the end of the second section of the flexible arm facing the stop has a point, so that when the arm is pressed towards a fixing element the point facilitates the rotation and relative divergence of the second section from the first section.

13. The shock absorber device for telescopic protection devices as described in claim 1 wherein the tubular elements include a plurality of shock absorber parts.

14. The shock absorber device for telescopic protection devices as described in claim 6 wherein the said shock absorber parts are set at an angle at the edge of the horizontal and vertical walls of the tubular elements.

15. The shock absorber device for telescopic protection devices as described in claim 1 wherein said shock absorber parts include a groove, said groove being parallel to the edge of the horizontal and vertical walls of the tubular elements, so as to facilitate the bending of the shock absorber part beside the said horizontal and vertical walls of the tubular elements.

16. A scraper device, including a shock absorber device as described in claim 1.

17. The telescopic protection device, including a scraper device as described in claim 16.

18. A shock absorber device for telescopic protection devices, said protection devices including a plurality of tubular covering elements which slide inside one another in a defined direction, each tubular element having a front edge and a rear edge, said front edge being fitted with a scraper connected to the front margin of a supporting bar, said bar being fixed along the front edge and said rear edge being fitted with a stop for a rear margin of the bar during the extension of the tubular elements, the device including at least a first shock absorber part, being positioned and operating between the rear margin and the stop of two adjacent tubular elements, said first shock absorber part alternatively being fitted to the rear margin or the stop, said first shock absorber part comprising:

at least a portion for connection to a slotted zone or seat on the rear margin or the stop by connecting means; and at least one flexible arm in a plane substantially parallel with the direction of sliding, said flexible arm extending from the connecting portion and protruding from the bar or stop towards the stop or the rear margin, so as to absorb the impact between the two adjacent tubular elements, when the telescopic protection device is in the extension stage, wherein the flexible arm of the shock absorber part includes a first section, this being substantially perpendicular to the direction of extension of the tubular elements, and a second section, this being connected to the first section and forming an obtuse angle with the first section.

* * * * *